United States Patent
Rengasamy

(10) Patent No.: US 11,628,684 B2
(45) Date of Patent: Apr. 18, 2023

(54) WHEEL END ASSEMBLY AND METHOD OF SERVICING

(71) Applicant: ArvinMeritor Technology, LLC, Troy, MI (US)

(72) Inventor: Srinivasa Perumal Rengasamy, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 162 days.

(21) Appl. No.: 17/214,478

(22) Filed: Mar. 26, 2021

(65) Prior Publication Data

US 2022/0305846 A1  Sep. 29, 2022

(51) Int. Cl.
| *F16D 65/12* | (2006.01) |
| *B60B 27/00* | (2006.01) |
| *F16D 65/02* | (2006.01) |

(52) U.S. Cl.
CPC ........ *B60B 27/0052* (2013.01); *F16D 65/123* (2013.01); *F16D 2065/1384* (2013.01); *F16D 2065/1392* (2013.01)

(58) Field of Classification Search
CPC ....... B60B 27/0052; F16D 65/123–128; F16D 2065/1384; F16D 2065/1392
USPC ...................... 188/17, 18 A, 218 XL; 301/6.8
See application file for complete search history.

(56) References Cited

U.S. PATENT DOCUMENTS

| 2,251,538 A | 8/1941 | Ash |
| 7,281,769 B2 | 10/2007 | Pete et al. |
| 9,897,154 B2* | 2/2018 | Root ................... B60B 27/0052 |
| 10,899,174 B2 | 1/2021 | Sinka et al. |
| 2006/0012242 A1 | 1/2006 | Pete et al. |
| 2015/0015057 A1* | 1/2015 | Oberti ................... F16D 65/847 188/218 XL |
| 2018/0340584 A1* | 11/2018 | Wittlinger ............... B60T 1/065 |
| 2020/0025269 A1* | 1/2020 | Sabeti ................... F16D 65/123 |
| 2021/0039435 A1* | 2/2021 | White ................... F16D 65/123 |

FOREIGN PATENT DOCUMENTS

| EP | 0834670 A1 | 4/1998 |
| WO | 95/13198 A1 | 5/1995 |
| WO | 2018/217725 A2 | 11/2018 |
| WO | 2020/018277 A1 | 1/2020 |

OTHER PUBLICATIONS

Extended European Search Report dated Jun. 23, 2022 for related European Appln. No. 22164421.4; 8 Pages.
India First Examination Report dated Oct. 11, 2022 for India Application No. 202114056508; 6 pages.

* cited by examiner

*Primary Examiner* — Christopher P Schwartz
(74) *Attorney, Agent, or Firm* — Brooks Kushman PC

(57) ABSTRACT

A wheel end assembly and a method of servicing. The wheel end assembly may include a wheel hub, a mounting ring, and a brake rotor. The mounting ring may be removably coupled to the wheel hub with a first set of fasteners. The brake rotor may be removably mounted to the mounting ring with a second set of fasteners.

20 Claims, 4 Drawing Sheets

WHEEL END ASSEMBLY AND METHOD OF SERVICING

TECHNICAL FIELD

This relates to a wheel end assembly and a method of servicing a wheel end assembly.

BACKGROUND

A two-component wheel hub is disclosed in U.S. Pat. No. 7,281,769.

SUMMARY

In at least one embodiment a wheel end assembly is provided. The wheel end assembly may include a wheel hub, a mounting ring, and a brake rotor. The wheel hub may be rotatable about an axis. The mounting ring may extend around the wheel hub and may be removably coupled to the wheel hub with a first set of fasteners. The brake rotor may encircle the wheel hub and may be removably mounted to the mounting ring with a second set of fasteners.

In at least one embodiment, a method of servicing a wheel end assembly is provided. The method may include removing a first set of fasteners to detach a mounting ring that encircles a wheel hub from the wheel hub. The wheel hub may be rotatable about an axis and may have an outboard end and an inboard end. A second set of fasteners may be removed to detach the brake rotor from the mounting ring. The mounting ring and the brake rotor may be removed from the wheel hub by moving the mounting ring and the brake rotor in an axial direction toward the outboard end of the wheel hub.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
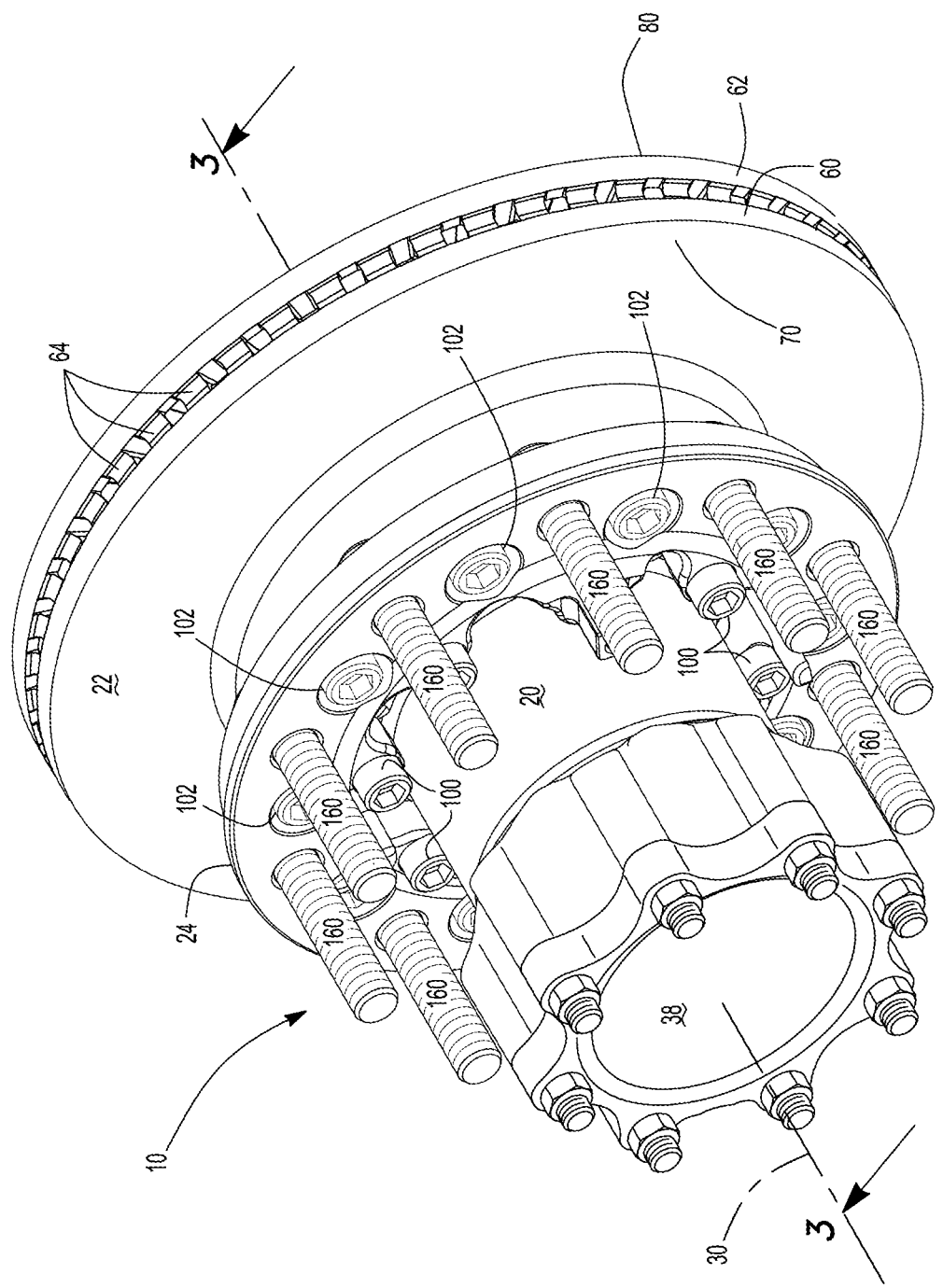
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, military transport or weaponry vehicle, or cargo loading equipment for land, air, or marine vessels or a trailer that may be provided with a vehicle.

Figure 3:
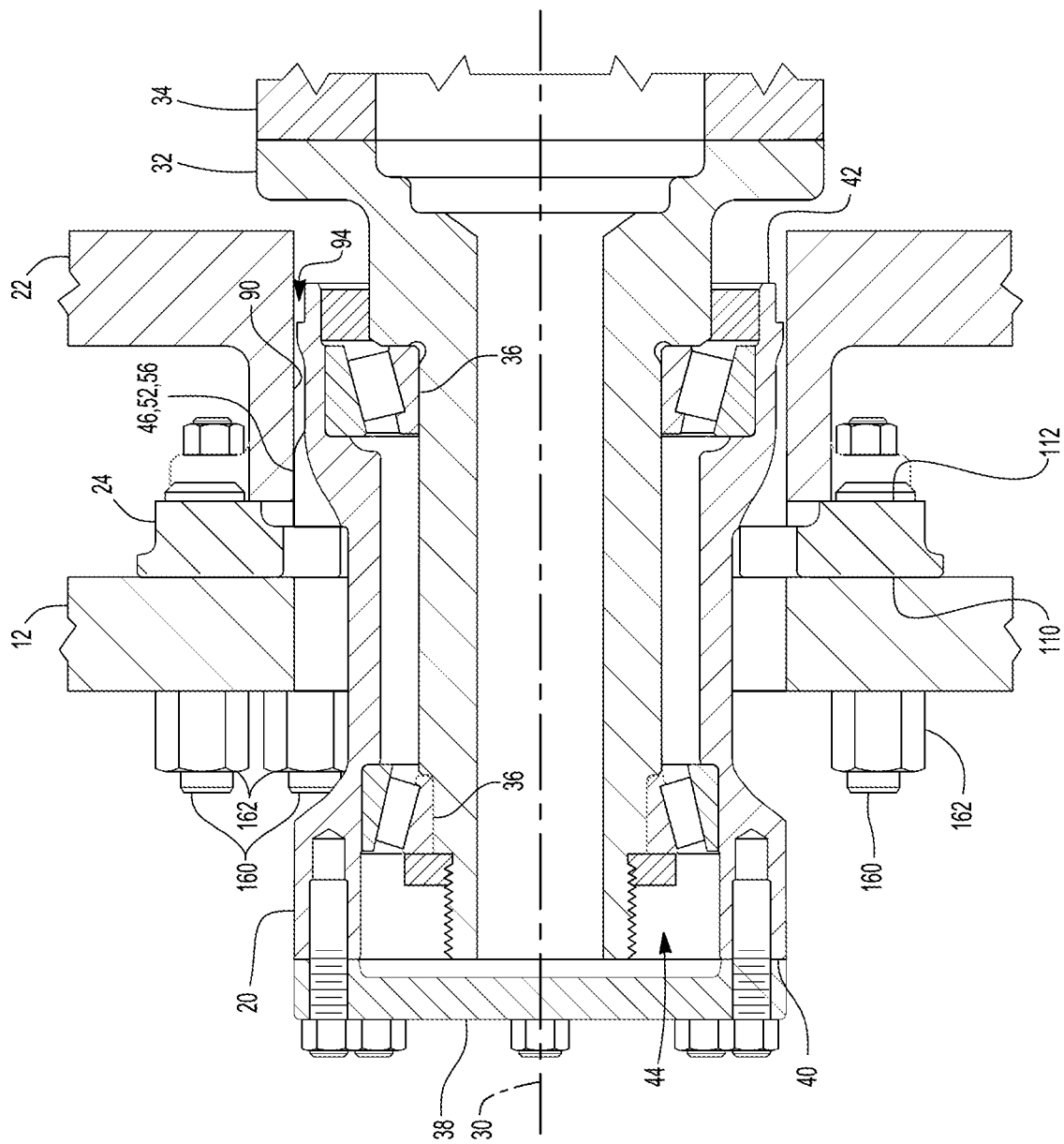
FIG. 3 is a section view of the wheel end assembly along section line 3-3 with the addition of a wheel and components that support the wheel end assembly.

Referring to FIG. 3, the wheel end assembly 10 may facilitate mounting and rotation of a wheel 12 upon which a tire may be mounted. For clarity, only a portion of the wheel 12 is shown in FIG. 3. The wheel end assembly 10 may be associated with a driven wheel or a non-driven wheel. A driven wheel may receive torque from a torque source, such as an internal combustion engine or electric motor. For instance, a shaft such as an axle shaft may transmit torque from the torque source to the wheel end assembly 10 to rotate the wheel 12. A non-driven wheel may not receive torque from a torque source. An axle shaft may not be provided in such a configuration.

Figure 2:
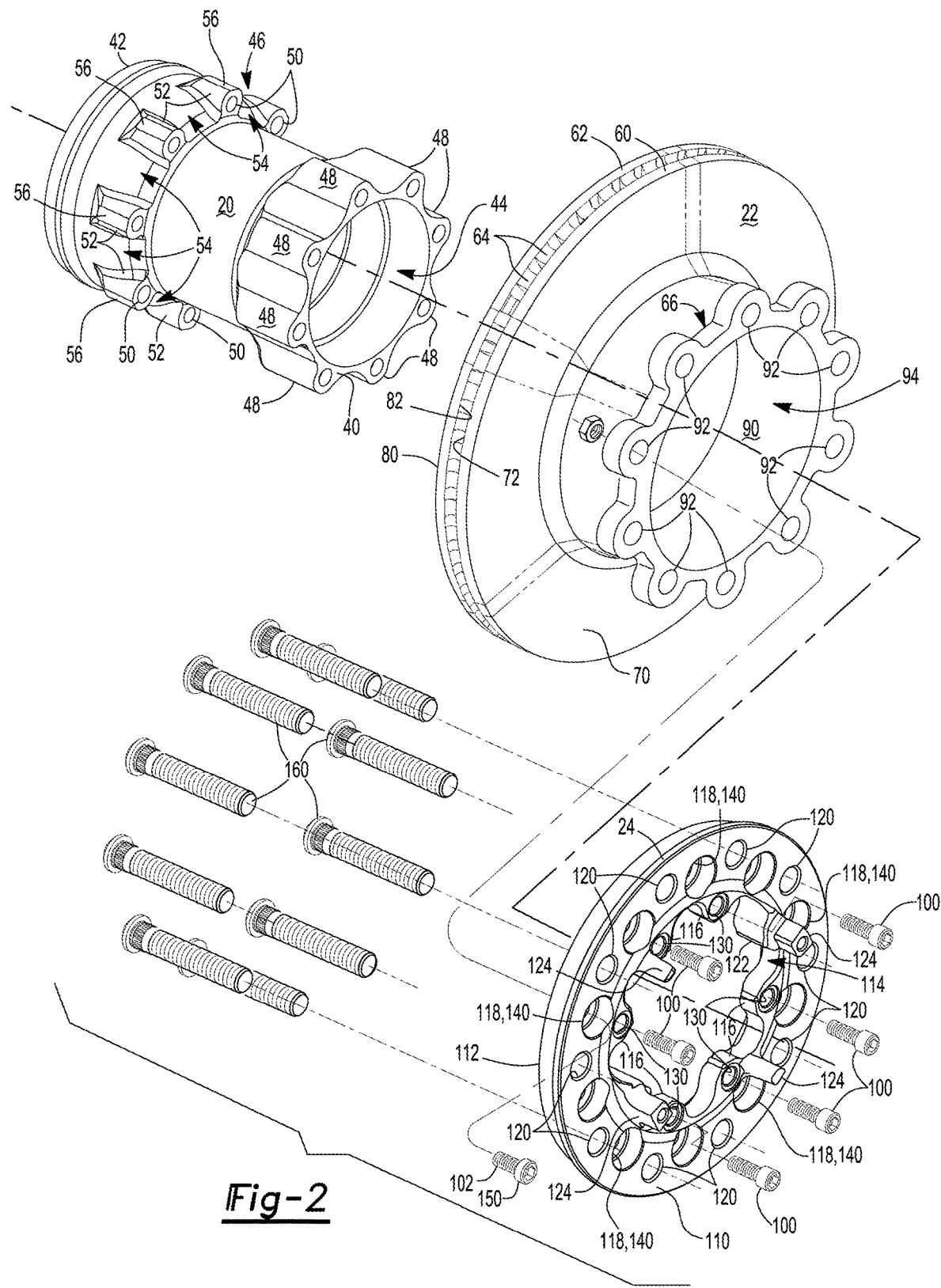
FIG. 2 is an exploded view of a portion of the wheel end assembly shown in FIG. 1.

Referring to FIGS. 1-3, the wheel end assembly 10 may include a wheel hub 20, a brake rotor 22, and a mounting ring 24. The wheel hub 20, the brake rotor 22, and the mounting ring 24 are separate components.

The wheel hub 20 may be rotatable about an axis 30. As is best shown in FIG. 3, the wheel hub 20 may be rotatable about the axis 30 with respect to a spindle 32. The spindle 32 may be provided with or may be mounted to a structural component 34, such as an axle assembly, a steerable knuckle, a non-steerable knuckle, or the like. In at least one configuration, the wheel hub 20 may be rotatably supported by one or more wheel bearings 36 that may be disposed on the spindle 32. In the configuration shown, the wheel bearings 36 may encircle the spindle 32 and may be axially positioned between a hub cap 38 and a hub seal. In at least one configuration, the wheel hub 20 may include an outboard end 40, an inboard end 42, a hub cavity 44, a mounting portion 46, and a plurality of bosses 48.

Referring to FIGS. 2 and 3, the outboard end 40 may face away from the structural component 34. The outboard end 40 may face toward and may engage the hub cap 38. Alternatively, another component such as an axle shaft flange may engage the outboard end 40. The bosses 48 may extend from the outboard end 40 in a direction that extends toward the mounting portion 46.

The inboard end 42 may be disposed opposite the outboard end 40. The inboard end 42 may face toward and may engage the structural component 34.

The hub cavity 44 may extend around the axis 30. The hub cavity 44 may receive various components that may be associated with the wheel end assembly 10, such as the spindle 32, wheel bearings 36, seals, and the like.

The mounting portion 46 may facilitate mounting of the mounting ring 24. The mounting portion 46 may be disposed opposite the hub cavity 44 and may at least partially extend around the axis 30. For instance, the mounting portion 46 may protrude away from the axis 30 and may include a plurality of fastener holes 50 and a plurality of mounting bosses 52 as is best shown in FIG. 2.

The fastener holes 50 may be arranged around the axis 30 and may extend parallel or generally parallel to the axis 30. Each fastener hole 50 may receive a fastener that may attach the mounting ring 24 to the hub 20 as will be discussed in more detail below.

A plurality of mounting bosses 52 may be provided with the mounting portion 46. The mounting bosses 52 may be arranged around the axis 30 and may be configured as lobes that may be spaced apart from each other such that a gap 54 may be provided between adjacent mounting bosses 52. It is also contemplated that the gaps may be omitted, in which case the mounting portion 46 may be considered a single unified mounting boss. In at least one configuration, a fastener hole 50 may be provided with each mounting boss 52. The mounting bosses 52 may help orient and/or support the brake rotor 22. For instance, the mounting bosses 52 or both may define an outer circumferential surface 56 that may be disposed at a generally constant radial distance from the axis 30 and that may be configured to be received inside and may engage the brake rotor 22.

Referring to FIG. 2, a plurality of bosses 48 may be provided between the outboard end 40 and the mounting portion 46. The bosses 48 may be arranged around the axis 30 and may be configured as lobes that may be spaced apart from each other such that a gap may be provided between adjacent bosses 48.

Referring to FIGS. 1-3, the brake rotor 22 may be associated with a disc brake and may have friction surfaces that may facilitate braking of the wheel 12. The brake rotor 22 may be removably mountable to the mounting ring 24. As such, the brake rotor 22 may be rotatable about the axis 30 with the wheel hub 20 and the mounting ring 24 when the mounting ring 24 and the brake rotor 22 are coupled to the wheel hub 20. In addition, the brake rotor 22 may not be directly fastened to the wheel hub 20. As is best shown in FIG. 3, the brake rotor 22 and the wheel 12 may be disposed on opposite sides of the mounting ring 24 and may encircle or at least partially encircle the wheel hub 20. In at least one configuration and as is best shown with Reference to FIGS. 1 and 2, the brake rotor 22 may include a first panel 60, a second panel 62, a set of vanes 64, a mounting portion 66, or combinations thereof.

The first panel 60 may be configured as a ring that may extend around the axis 30. In at least one configuration, the first panel 60 may have a first friction surface 70 and a first interior surface 72.

The first friction surface 70 may be engaged by friction material of a first brake pad to slow rotation of the brake rotor 22 and the wheel 12 about the axis 30. The first friction surface 70 may be substantially planar. In addition, the first friction surface 70 may be disposed substantially perpendicular to the axis 30. The term "substantially perpendicular" is used to designate features or axes that are the same as or very close to perpendicular and includes features that are within ±2° of being perpendicular each other.

The first interior surface 72 may be disposed opposite the first friction surface 70. The first interior surface 72 may face toward the second panel 62 and may be spaced apart from the second panel 62. The first interior surface 72 may be disposed substantially parallel to the first friction surface 70. The term "substantially parallel" means the same as or very close to parallel and includes features or axes that are within ±2° of being parallel each other.

The second panel 62 may be spaced apart from the first panel 60. The first panel 60 and the second panel 62 may have substantially similar configurations. For instance, the first panel 60 and the second panel 62 may have mirror symmetry with respect to a center plane that may be disposed perpendicular to the axis 30 and that may be disposed between the first panel 60 and the second panel 62. Accordingly, the second panel 62 may be configured as a ring that may extend around the axis 30 and may have a second friction surface 80 and a second interior surface 82.

The second friction surface 80 may be engaged by friction material of second brake pad to slow rotation of the brake rotor 22 and the wheel 12 about the axis 30. The second friction surface 80 may face away from the first friction surface 70 and may be substantially planar. In addition, the second friction surface 80 may be disposed substantially perpendicular to the axis 30 and may be disposed substantially parallel to the first friction surface 70.

The second interior surface 82 may be disposed opposite the second friction surface 80. The second interior surface 82 may face toward the first interior surface 72 of the first panel 60 and may be spaced apart from the first panel 60. The second interior surface 82 may be disposed substantially parallel to the second friction surface 80.

The set of vanes 64 may extend from the first panel 60 to the second panel 62. More specifically, the vanes 64 may extend from the first interior surface 72 of the first panel 60 to the second interior surface 82 of the second panel 62. The vanes 64 may be arranged around the axis 30 in a repeating pattern and may be spaced apart from each other. As such, the vanes 64 may interconnect the first panel 60 with the second panel 62 while providing an air gap between the first panel 60 and the second panel 62 that may facilitate cooling of the brake rotor 22.

Referring primarily to FIG. 2, the mounting portion 66 may at least partially encircle the wheel hub 20. In addition, the mounting portion 66 may extend in an axial direction from the first panel 60 toward the mounting ring 24 or to the mounting ring 24. In at least one configuration, the mounting portion 66 may at least partially define an inner side 90 and may include one or more fastener holes 92.

The inner side 90 may face toward the axis 30 and may extend around the axis 30. In addition, the inner side 90 may face toward and may engage the mounting portion 46 of the wheel hub 20. For instance, the inner side 90 may face toward and may engage one or more outer circumferential surfaces 56 of the mounting bosses 52. The inner side 90 may define an inside diameter of the brake rotor 22 and a brake rotor opening 94 through which the wheel hub 20 may extend. The inside diameter of the mounting portion 66 may be disposed further from the axis 30 than at least a portion of the wheel hub 20 that extends axially from the brake rotor 22 to the outboard end 40 to allow the brake rotor 22 to slide onto the wheel hub 20 to facilitate installation of the brake rotor 22 or slide off of the wheel hub 20 to facilitate removal of the brake rotor 22. The inner side 90 may be disposed further from the axis 30 than the entire wheel hub 20 (e.g., the wheel hub 20 may be disposed closer to the axis 30 from the outboard end 40 to the inboard end 42 than the inner side 90 of the brake rotor 22 is disposed to the axis 30) in one or more configurations.

The fastener holes 92 may facilitate coupling of the brake rotor 22 to the mounting ring 24 as will be discussed in more detail below. The fastener holes 92 may have any suitable configuration. For instance, the fastener holes 92 may be configured as through holes or as blind holes. In addition, the fastener holes 92 may be threaded holes or unthreaded holes.

Figure 4:
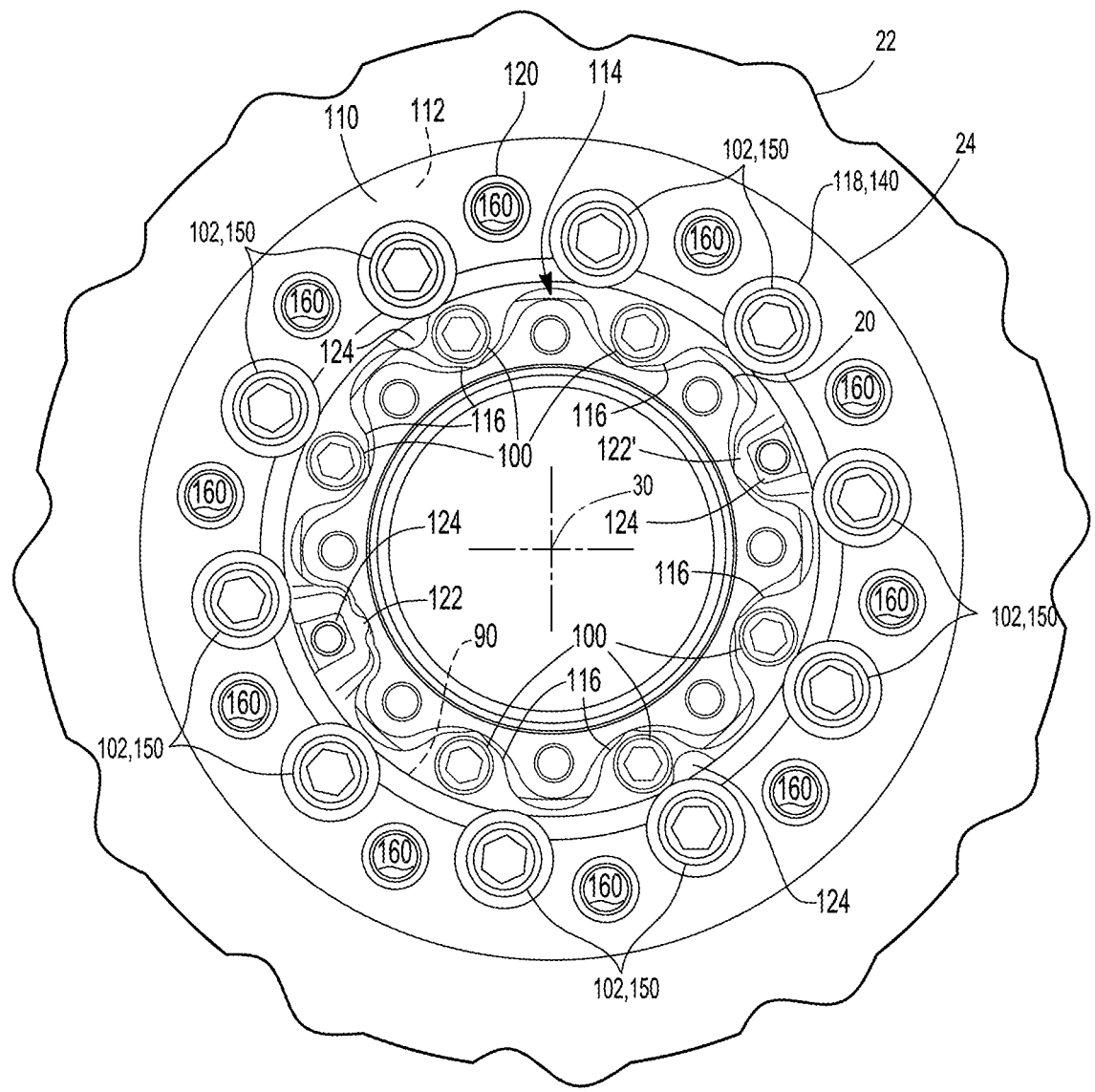
FIG. 4 is an end view of the portion of the wheel end assembly shown in FIG. 2.

Referring primarily to FIGS. 2-4, the mounting ring 24 may facilitate mounting of the brake rotor 22 to the wheel hub 20. For instance, the mounting ring 24 may be removably coupled to the wheel hub 20 with a first set of fasteners 100 and may be removably coupled to the brake rotor 22 with a second set of fasteners 102. The mounting ring 24 may extend at least partially around the wheel hub 20. For instance, the mounting ring 24 may encircle the wheel hub 20 and the axis 30. In at least one configuration and as is best shown with reference to FIG. 2, the mounting ring 24 may include a first side 110, a second side 112, and a mounting ring opening 114. The mounting ring 24 may also include a set of mounting flanges 116, a set of brake rotor fastener holes 118, a set of lug bolt holes 120, one or more rotational alignment features 122, one or more pilot features 124, or combinations thereof.

Referring to FIGS. 2 and 3, the first side 110 may face toward the wheel 12 and may face away from the brake rotor 22. The wheel 12 may be engageable with the first side 110.

The second side 112 may be disposed opposite the first side 110. As such, the second side 112 may face away from the wheel 12 and toward the brake rotor 22. The brake rotor 22 may be engageable with the second side 112.

Referring primarily to FIGS. 2 and 4, the mounting ring opening 114 may receive wheel hub 20. The mounting ring opening 114 may extend around the axis 30 and may be a through hole that may extend through the mounting ring 24. The mounting ring opening 114 may have a larger diameter or may be disposed further away from the axis 30 than the wheel hub 20. The wheel hub 20 may extend through the mounting ring opening 114.

The set of mounting flanges 116 may be disposed in the mounting ring opening 114. Each mounting flange 116 may face toward the axis 30 and may extend toward the axis 30. In the configuration shown, six mounting flanges 116 are illustrated; however, it is contemplated that a greater or lesser number of mounting flanges 116 may be provided. The mounting flanges 116 are depicted as being spaced apart from each other such that a mounting flange 116 may be aligned with a corresponding gap 54 between adjacent mounting bosses 52 of the wheel hub 20; however, it is contemplated that the mounting flanges 116 may have any suitable configuration that is compatible with the mounting portion 46 or arrangement of the mounting bosses 52. For instance, one or more mounting flanges 116 may be contiguous such that a gap is not provided between them. In at least one configuration and as is best shown in FIG. 2, a mounting flange 116 may define a mounting flange hole 130 that may receive a member of the first set of fasteners 100.

The mounting flange hole 130 may be a through hole that may be aligned with a corresponding fastener hole 50 of the wheel hub 20. In at least one configuration, the mounting flange holes 130 may be spaced apart from each other and may be disposed at a substantially constant radial distance from the axis 30. A member of the first set of fasteners 100 may extend through the mounting flange hole 130 and into a corresponding fastener hole 50 of the wheel hub 20 to attach or couple the mounting ring 24 to the wheel hub 20. The fasteners 100 may have any suitable configuration. For instance, a fastener 100 may be configured as a threaded fastener such as a bolt. A thread of the fastener 100 may mate with a thread of the fastener hole 50 of the wheel hub 20 when the fastener hole 50 is a threaded hole. Alternatively, it is contemplated that a fastener 100 may be secured with a nut, such as in a configuration in which the fastener 100 protrudes through a fastener hole 50. It is also contemplated that one or more fasteners may be a dowel, such as a solid dowel or a split dowel.

Referring to FIGS. 2 and 4, the set of brake rotor fastener holes 118 may be defined by the mounting ring 24. A brake rotor fastener hole 118 may be configured as a through hole that may be aligned with a corresponding fastener hole 92 of the brake rotor 22. Each brake rotor fastener hole 118 may include a counterbore 140 that may extend from the first side 110 toward the second side 112. In at least one configuration, the brake rotor fastener holes 118 may be spaced apart from each other and may be disposed at a substantially constant radial distance from the axis 30. The brake rotor fastener holes 118 may be disposed at a different distance from the axis 30 than the mounting flange holes 130. For instance, the brake rotor fastener holes 118 may be disposed further from the axis 30 than the mounting flange holes 130 are disposed from the axis 30.

A member of the second set of fasteners 102 may extend through a brake rotor fastener hole 118 and into a corresponding fastener hole 92 of the brake rotor 22 to attach or couple the brake rotor 22 to the mounting ring 24. The fasteners 102 may have any suitable configuration. For instance, a fastener 102 may be configured as a threaded fastener such as a bolt. A thread of the fastener 102 may mate with a thread of the fastener hole 92 of the brake rotor 22 when the fastener hole 92 is a threaded hole. Alternatively, it is contemplated that a fastener 102 may be secured with a nut in a configuration in which the fastener 102 protrudes through a fastener hole 92.

A head 150 of a member of the second set of fasteners 102 may be completely received inside the brake rotor fastener hole 118. For instance, the head 150 of a fastener 102 may be received in the counterbore 140 of a brake rotor fastener hole 118 such that the head 150 may not protrude from the first side 110, thereby allowing the wheel 12 to flushly engage the first side 110 of the mounting ring 24.

The set of lug bolt holes 120 may be defined by the mounting ring 24. A lug bolt hole 120 may be configured as a through hole that may extend from the first side 110 to the second side 112 of the mounting ring 24. In at least one configuration, the lug bolt holes 120 may be positioned further from the axis 30 than the brake rotor fastener holes 118. Each lug bolt hole 120 may receive a lug bolt 160 that may facilitate mounting of a wheel 12. The lug bolts 160 may have a threaded shank that extend from the mounting ring 24 in a direction that may extend away from the brake rotor 22. The lug bolts 160 may extend substantially parallel to the axis 30 and may extend through a corresponding holes in the wheel 12. As is best shown in FIG. 3, a lug nut 162 may be threaded onto the lug bolt 160 and may be disposed on a side of the wheel 12 that is disposed opposite the mounting ring 24 to secure the wheel 12 to the mounting ring 24.

Referring to FIGS. 2 and 4, one or more rotational alignment features 122 may be provided with the mounting ring 24. In the configuration shown, two rotational alignment features 122 are depicted; however, it is contemplated that a greater or lesser number of rotational alignment features 122 may be provided. For convenience in reference, the two rotational alignment features that are shown may be referred to as a first rotational alignment feature 122 and a second rotational alignment feature 122'. The first rotational alignment feature 122 and the second rotational alignment feature 122' may have different configurations.

The rotational alignment features 122, 122' may be disposed in the mounting ring opening 114 and may extend toward the wheel hub 20 and the axis. The rotational alignment features 122, 122' may be axially positioned between the wheel 12 and the brake rotor 22. As is best shown in FIG. 4, the rotational alignment features 122, 122' may be spaced apart from each other and may be positioned between two different members of the set of mounting flanges 116.

The rotational alignment features 122, 122' may cooperate with the wheel hub 20 to permit the mounting ring 24 to be mounted to the wheel hub 20 in a limited number of rotational positions. For instance, the rotational alignment features 122, 122' and the wheel hub 20 may permit the mounting ring 22 to be mounted in a single rotational position about the axis 30. This may be accomplished in various ways. For instance, at least one rotational alignment feature 122, 122' may extend toward the axis 30 by a different length than the mounting flanges 116, have a different width than the mounting flanges 116, or combinations thereof. For instance, at least one rotational alignment feature 122, 122' may extend toward the axis 30 by a different length than the mounting flanges 116 and may only fit within one particular gap between the bosses 48 when properly installed. As another example, at least one rotational alignment feature 122, 122' may have a different width or extend along a different angular distance with respect to the axis 30 than the mounting flanges 116 and the wheel hub 20 may be configured with corresponding gaps 54 between adjacent mounting bosses 52 in which the rotational alignment feature 122, 122' may only fit within one particular gap between the bosses 48 when properly installed. As another example, the first rotational alignment feature 122 may have a different length and/or width than the second rotational alignment feature 122' and at least one of the rotational alignment features 122, 122' may be receivable within a limited number of gaps between the bosses 48 when properly installed.

One or more pilot features 124 may extend from the mounting ring 24. In at least one configuration, a pilot feature 124 may extend from the first side 110 in an axial direction that may extend away from the brake rotor 22. A pilot feature 124 may be configured to help guide installation of the wheel 12 and help center the wheel 12 about the axis 30. For instance, the pilot feature 124 may be received inside of a wheel opening that may be defined by an inside circumference of a wheel flange through which the lug bolts 160 may extend. The inside circumference of the wheel flange may or may not engage a pilot feature 124 once the lug bolts 160 are tightened.

The wheel end assembly 10 as described above may allow a brake rotor 22 to be removed from a wheel hub 20 or installed on a wheel hub 20 without disassembling the wheel hub 20. Thus, a brake rotor 22 may be installed on or removed from the wheel hub 20 when the wheel hub 20 is installed on a vehicle. As an example, a brake rotor 22 may be serviced in the following manner.

First, the wheel 12 may be detached from and disengaged from the wheel end assembly 10. The lug nuts 162 may be removed from the lug bolts 160. Then, the wheel 12 may be removed from the lug bolts 160 by moving the wheel 12 along the axis 30 in a direction that extends away from the brake rotor 22.

Next, the mounting ring 24 may be detached from the wheel hub 20 by removing the fasteners 100.

Next, the mounting ring 24 and the brake rotor 22 may be removed from the wheel hub 20. The mounting ring 24 and the brake rotor 22 may be removed either together or separately. The mounting ring 24 and the brake rotor 22 may be removed together by keeping the brake rotor 22 coupled to the mounting ring 24 with the second set of fasteners 102 and moving the mounting ring 24 and the brake rotor 22 together along the axis 30 toward the outboard end 40 of the wheel hub 20. The mounting ring 24 may be subsequently detached from the brake rotor 22 by removing the second set of fasteners 102. The mounting ring 24 and the brake rotor 22 may be removed separately by removing the second set of fasteners 102 to detach the mounting ring 24 from the brake rotor 22 before the mounting ring 24 is removed from the wheel hub 20. The brake rotor 22 may then be repaired or replaced as appropriate.

A replacement brake rotor may be installed on the wheel hub 20 using a sequence of steps that may generally be a reverse sequence of the removal steps discussed above. A replacement brake rotor may be a different component than a previously installed brake rotor or may be the same component as the previously installed brake rotor. For instance, the replacement brake rotor may be the previously installed brake rotor after being inspected and/or reworked. For clarity, the term brake rotor is used below to generically designate either type of replacement brake rotor.

The brake rotor 22 may be positioned such that the brake rotor opening 94 is sufficiently aligned with the axis 30. Then, the brake rotor 22 may be positioned on the wheel hub 20 by inserting the wheel hub 20 into the brake rotor opening 94 and moving the brake rotor 22 toward the inboard end 42.

Next, the mounting ring 24 may be positioned such that the mounting ring opening 114 is sufficiently aligned with the wheel hub 20 and the axis 30. If rotational alignment features are provided, the mounting ring 24 may be rotated about the axis 30 to obtain proper rotational alignment with the brake rotor 22. Then, the mounting ring 24 may be positioned on the wheel hub 20 by inserting the mounting ring 24 into the mounting ring opening 114 and moving the mounting ring 24 axially inboard toward the brake rotor 22.

Next, the brake rotor 22 may be fastened to the mounting ring 24 with the second set of fasteners 102 and the mounting ring 24 may be fastened to the wheel hub 20 with the first set of fasteners 100. It is also contemplated that the brake rotor 22 may be fastened to the mounting ring 24 with the second set of fasteners 102 before the brake rotor 22 is positioned on the wheel hub 20.

Finally, the wheel 12 may be mounted on the wheel end assembly 10. The lug bolt holes in the wheel 12 may be aligned with the lug bolts 160. Then, the wheel 12 moved along the axis 30 into engagement with the mounting ring 24. The pilot features 124 may help align the wheel 12 to the wheel end assembly 10 during installation of the wheel 12. The lug nuts 162 may be threaded onto the lug bolt 160 and tightened to secure the wheel 12 against the mounting ring 24.

A wheel end assembly as described above may allow a brake rotor to be installed on a wheel hub or removed from a wheel hub without disassembling the wheel hub or removing the wheel hub from a vehicle, which may reduce assembly and disassembly time and help reduce associated costs. The seals of the wheel hub and preload force on the wheel bearings may not be disturbed and may not need to be reset or adjusted when disassembly of the wheel hub is avoided, thereby helping further reduce service time and costs. Providing the wheel hub and the brake rotor as separate components may make the wheel hub and the brake rotor easier to handle and may eliminate the need for special fitting tools or equipment for servicing the brake rotor. Providing a mounting ring that is a separate component from the wheel hub and the brake rotor may allow the mounting ring to function as an adapter that may accommodate different wheels and wheel hub configurations. For instance, mounting rings may be provided in various diameters or with various lug bolt mounting circles or lug bolt mounting patterns to accommodate different wheel sizes or wheel configurations. This in turn may allow the wheel hub, the brake rotor, or both to be standardized or commonized the across various vehicles. Additionally, the wheel end assembly may be compatible with hub-piloted wheels or stud-piloted wheels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
a wheel hub that is rotatable about an axis;
a mounting ring that extends around the wheel hub and is removably coupled to the wheel hub with a first set of fasteners, wherein a plurality of lug bolts that are adapted to support a wheel extend from the mounting ring; and
a brake rotor that encircles the wheel hub and that is removably mounted to the mounting ring with a second set of fasteners.

2. The wheel end assembly of claim 1 wherein the mounting ring defines a brake rotor fastener hole and wherein a member of the second set of fasteners extends through the brake rotor fastener hole to couple the brake rotor to the mounting ring.

3. The wheel end assembly of claim 2 wherein the brake rotor includes a first panel, a second panel that is spaced apart from the first panel, a plurality of vanes that extend between the first panel and the second panel, and a mounting portion that encircles the wheel hub and that extends from the first panel to the mounting ring, wherein the member of the second set of fasteners is attached to the mounting portion.

4. The wheel end assembly of claim 3 wherein an inside diameter of the mounting portion is disposed further from the axis than the wheel hub is disposed from the axis.

5. The wheel end assembly of claim 1 wherein the mounting ring defines a mounting ring opening that receives the wheel hub and a set of mounting flanges that are disposed in the mounting ring opening, wherein each member of the set of mounting flanges defines a mounting flange hole that receives a member of the first set of fasteners.

6. The wheel end assembly of claim 5 wherein the mounting ring has a first rotational alignment feature that is disposed in the mounting ring opening and extends toward the wheel hub, wherein the first rotational alignment feature is positioned between two members of the set of mounting flanges.

7. The wheel end assembly of claim 6 wherein the mounting ring has a second rotational alignment feature that is disposed in the mounting ring opening and that extends toward the wheel hub, wherein the second rotational alignment feature has a different configuration than the first rotational alignment feature.

8. The wheel end assembly of claim 1 wherein the brake rotor and a wheel are disposed on opposite sides of the mounting ring.

9. The wheel end assembly of claim 8 wherein the mounting ring has a first side that faces away from the brake rotor and a second side that faces toward the brake rotor, wherein the wheel engages the first side and the brake rotor engages the second side.

10. The wheel end assembly of claim 1 wherein the mounting ring encircles the wheel hub and defines a mounting ring opening through which the wheel hub extends.

11. The wheel end assembly of claim 1 wherein the brake rotor has an inner side that extends around the axis and that at least partially defines a brake rotor opening through which the wheel hub extends, wherein the inner side is disposed further from the axis than the entire wheel hub is disposed from the axis.

12. The wheel end assembly of claim 1 wherein the mounting ring includes a pilot feature that extends in an axial direction away from the brake rotor and that is adapted to be received inside a wheel.

13. A method of servicing a wheel end assembly comprising:
removing a first set of fasteners to detach a mounting ring that encircles a wheel hub from the wheel hub, the wheel hub being rotatable about an axis and having an outboard end and an inboard end, wherein a plurality of lug bolts that are adapted to support a wheel extend from the mounting ring;
removing a second set of fasteners to detach a brake rotor from the mounting ring; and
removing the mounting ring and the brake rotor from the wheel hub by moving the mounting ring and the brake rotor in an axial direction toward the outboard end of the wheel hub.

14. The method of claim 13 wherein the mounting ring is detached from the wheel hub before the brake rotor is detached from the mounting ring.

15. The method of claim 13 wherein a wheel is detached and disengaged from the mounting ring before the mounting ring is detached from the wheel hub.

16. The method of claim 13 further comprising installing a replacement brake rotor by:
aligning a brake rotor opening of the replacement brake rotor with the wheel hub;
positioning the replacement brake rotor and the mounting ring on the wheel hub by inserting the wheel hub into the brake rotor opening and moving the replacement brake rotor axially toward the inboard end; and
fastening the mounting ring to the wheel hub.

17. A wheel end assembly comprising:
a wheel hub that is rotatable about an axis;
a mounting ring that extends around the wheel hub and is removably coupled to the wheel hub with a first set of fasteners, wherein the mounting ring defines a brake rotor fastener hole; and
a brake rotor that encircles the wheel hub and that is removably mounted to the mounting ring with a second set of fasteners, wherein a member of the second set of fasteners extends through the brake rotor fastener hole to couple the brake rotor to the mounting ring and a head of the member of the second set of fasteners is completely received inside the brake rotor fastener hole.

18. The wheel end assembly of claim 17 wherein a plurality of lug bolts that are adapted to support a wheel extend from the mounting ring.

19. A wheel end assembly comprising:
a wheel hub that is rotatable about an axis;
a mounting ring that extends around the wheel hub and is removably coupled to the wheel hub with a first set of fasteners, wherein the mounting ring defines a mounting ring opening that receives the wheel hub, the mounting ring has a set of mounting flanges that are disposed in the mounting ring opening and first and second rotational alignment features that are disposed in the mounting ring opening and extend toward the wheel hub, the first rotational alignment feature is positioned between two members of the set of mounting flanges, and the second rotational alignment feature has a different configuration than the first rotational alignment feature; and
a brake rotor that encircles the wheel hub and that is removably mounted to the mounting ring with a second set of fasteners, wherein the first rotational alignment feature and the second rotational alignment feature cooperate with the wheel hub to allow the mounting ring to be mounted to the wheel hub at a single rotational position.

20. The wheel end assembly of claim 19 wherein the mounting ring defines a lug bolt hole and wherein a lug bolt extends through the lug bolt hole.

\* \* \* \* \*